(12) United States Patent
Kulathu et al.

(10) Patent No.: US 8,788,108 B2
(45) Date of Patent: Jul. 22, 2014

(54) METHOD AND SYSTEM FOR DISTRIBUTED POWER MANAGEMENT

(75) Inventors: Ganesh Kulathu, Bangalore (IN); Martin Nykvist, Singsby (FI); Wolfgang Wimmer, Rietheim (CH); Otto Van Der Wal, Naarden (NL)

(73) Assignee: ABB Technology Ltd, Zürich (CH)

( * ) Notice: Subject to any disclaimer, the term of this patent is extended or adjusted under 35 U.S.C. 154(b) by 103 days.

(21) Appl. No.: 13/372,990

(22) Filed: Feb. 14, 2012

(65) Prior Publication Data

US 2012/0239216 A1    Sep. 20, 2012

Related U.S. Application Data

(63) Continuation of application No. PCT/IB2010/002008, filed on Aug. 13, 2010.

(30) Foreign Application Priority Data

Aug. 14, 2009 (IN) .......................... 1934/CHE/2009

(51) Int. Cl.
 *H02J 3/14* (2006.01)
(52) U.S. Cl.
 USPC .......................................... 700/295; 700/286
(58) Field of Classification Search
 None
 See application file for complete search history.

(56) References Cited

U.S. PATENT DOCUMENTS

2005/0216107 A1* 9/2005 O'Donnell et al. ............. 700/82
2009/0254655 A1 10/2009 Kidwell et al.

OTHER PUBLICATIONS

International Search Report (PCT/ISA/210) issued on Jul. 20, 2010, by European Patent Office as the International Searching Authority for International Application No. PCT/IB2010/000569.
Written Opinion (PCT/ISA/237) issued on Jul. 20, 2010, by Japanese Patent Office as the International Searching Authority for International Application No. PCT/IB2010/000569.
Office Action issued in U.S. Appl. No. 13/396,018, filed Feb. 14, 2012.
Apostolov, Alexander et al, "Load-Shedding in distribution Systems during Wide Area Disturbances", 18th International Conference on Electricity Distribution, CIRED 2005, Jun. 6-9, 2005, 4 pps.
Apostolov, Alexander et al, "Implementation of Accelerated Transmission Line Protection Schemes in Substations with IEC 61850", Transmission and Distribution Conference and Exposition, Apr. 21, 2008, 6 pps.

* cited by examiner

*Primary Examiner* — Ryan Jarrett
(74) *Attorney, Agent, or Firm* — Buchanan Ingersoll & Rooney PC

(57) ABSTRACT

A method and system for distributed power management with individual IEDs in a substation are disclosed. An exemplary technique can include providing multiple IEDs in a power network in the substation and integrating an intrinsic load shedding function in each IED. The technique can include identifying a power imbalance state at an individual IED and load shedding the individual IED using an intrinsic load shedding function when a power imbalance state is identified in a coordinated manner to achieve distributed power management in the substation.

15 Claims, 4 Drawing Sheets

METHOD AND SYSTEM FOR DISTRIBUTED POWER MANAGEMENT

RELATED APPLICATION

This application claims priority as a continuation application under 35 U.S.C. §120 to PCT/IB2010/002008, which was filed as an International Application on Aug. 13, 2010 designating the U.S., and which claims priority to Indian Application 1934/CHE/2009 filed in India on Aug. 14, 2009. The entire contents of these applications are hereby incorporated by reference in their entireties.

The invention relates generally to the field of power management systems, and more specifically to load shedding management within one or more substations whose automation networks have a common identity.

BACKGROUND

An electrical or power substation can involve electricity transmission and distribution systems where voltage is transformed from high to low or the reverse using transformers. Electric power may flow through several substations between generating plant and consumer or load, and the voltage may be transformed in several steps.

Industrial setups involve intense energy consumption and include one or multiple dedicated substations including both upstream substation connecting to the main source of power (either the grid or the in-house generator) and downstream substations for distribution of power to different load centers distributed over various parts of industries. In addition, the industry may have its own generation system to meet its energy demand and also have power management system for effectively handling power for its purpose.

Power management functionality includes load shedding, metering, measuring voltage, current, power, energy and other power-quality parameters for effective handling of power demands for various equipments and processes, power fluctuations, equipment constraints etc. It is becoming common to find this kind of setup with process industries such as refineries and power utilities. However, such setup is also applicable to other process industries such as cement, pulp and paper, petrochemical plants, fertilizers, mining and metals, water and waste water treatment plants etc.

The substations (both upstream and downstream as mentioned hereinabove) can include several power and distribution transformers, cabling, switching, reactive power and grounding equipment. These power equipment should be protected against power system anomalies like current and voltage surges and this can be accomplished by Intelligent Electronic Devices (IEDs) that provide different substation protection, control, monitoring and metering functions. The IEDs are microprocessor-based equipment that are associated with power system equipment, such as circuit breakers, generators, transformers, power lines, power cables, reactors, motors, capacitor banks etc. The IEDs can receive primary power system information like voltage and current from sensors to perform various protection and monitoring functions. Common types of IEDs include protective relaying devices, load tap changer controllers, circuit breaker controllers, recloser controllers, voltage regulators, etc. Thus a single IED can perform several protection, metering, monitoring and control functions concurrently.

Substation automation can form an important and complex aspect for maintenance and control of different equipments involved in different processes within the substation. Manual and automatic control command functions are also provided like closing and opening of switching equipment (circuit breakers and disconnectors), or raise/lower voltage levels in order to maintain the desired voltage levels. Multiple protocols exist for substation automation, which include many proprietary protocols with custom communication links. However, interoperation of devices from different vendors is highly desired for simplicity in implementation and use of substation automation devices.

The IEC61850 standard from International Electrotechnical Commission (IEC) advocates interoperability amongst Intelligent Electronic Devices (IEDs) from various manufacturers using common engineering models (for example, IEC61850 Common Engineering Model using Logical Nodes), data formats and communication protocol. Recent IEDs are therefore designed to support the IEC61850 standard for substation automation, which provides interoperability and advanced communications capabilities like GOOSE (Generic Object Oriented Substation Event) and MMS (Manufacturing Message System) communication profiles.

The power management functionality in the process industries like load shedding i.e. cutting off the electric current on certain lines/loads when the power demand becomes greater than the power supply, is currently implemented as a centralized function in distribution power automation systems and industrial power management systems. Centralized implementation of the load shedding function in a single process controller usually at the upstream substation has several shortcomings. For example, it causes high loading due to the integration of all load shedding functions for the complete power system network in a single process controller, where load shedding needs to be deployed. One skilled in the art will know that load shedding is commonly utilized for achieving power balance in electrical systems. Under heavy load, the power balance is negative and voltage support can be required. Alternately, under light load conditions, the power balance is positive and inductive compensation can be desired.

In the currently available load shedding systems the centralized load shedding process controller communicates with every IED to get input data (for example voltage, current, etc) needed for power balance based LS from various feeders at the substations to issue shed command information (information to shed a load for example) to the feeders through respective IEDs. Feeders as used herein can be an electrical circuit that may include generator, loads, conductors in conduit or a busway run, which carries a large block of power from the service equipment to a sub-feeder panel or a branch circuit panel or to some point at which the block power is broken into smaller circuits. (Feeders are also generally referred as the medium-voltage lines used to distribute electric power from a substation to consumers or to smaller substations).

Thus the availability of the LS function can depend solely on the centralized load shedding process controller. Any outage of the centralized load shedding process controller results in LS function being unavailable for the entire substation.

The power balance (and power balance principles) as described herein is balancing of supply from the generation side and demand from the load side of power in the process plant. The power balance calculations as used herein below refer to known calculations for electrical networks and components to achieve the power balance. An electrical network as would be known to one skilled in the art is an interconnection of electrical elements such as resistors, inductors, capacitors, transmission lines, voltage sources, current sources, and switches.

In order to overcome the limitation of single point failure as outlined above, and ensuring high availability of load shedding function, additional hardware can be employed or the load shedding function is distributed in the various IEDs. In one example, this is achieved as a frequency based function available in every feeder IED that detects a rate of fall of frequency or under-frequency condition in the power network and issue trip commands to its own feeder. However, this method is a discrete method (to power demand and supply condition) and hence the amount of loads shed is always more than needed to ensure system stability.

Hence there is a need to develop a technique that allows for an improved load shedding function, based on power management principle, distributed amongst various IEDs, in one or more of substations in the process plant.

BRIEF DESCRIPTION

A method is disclosed for distributed power management in an electrical power network divided into one or more sections and having plural intelligent electronic devices (IEDs) communicatively connected in a communication network configured for power management function in the one or more sections of the electrical power network, the method comprising: identifying a first IED from the plural IEDs in a section of the electrical power network that issues a load shed command; exchanging power network data between the first IED and one or more IEDs from the plural IEDs in the electrical power network; having the first IED or a second IED of the plural IEDs in the electrical power network identify a power imbalance state in the electrical power network based on the exchanged power network data and generate a load shed trigger in the electrical power network; having the first IED estimate a power balance condition in the electrical power network based on the load shed trigger generated in the electrical power network; and having the first IED or the second IED perform coordinated power management in the electrical power network based on the estimated power balance condition in the electrical power network.

A system is disclosed for distributed power management in an electrical power network divided into one or more sections and having plural intelligent electronic devices (IEDs) communicatively connected in a communication network configured for a power management function in the one or more sections of the electrical power network, the system comprising: a plurality of identified IEDs for one or more sections in a electrical power network to issue a load shed command in their respective sections in coordination with each other, wherein the coordination is established with a programmed time delay in each of the identified IEDs based on a priority of the identified IED or/and through message communication between the identified IEDs.

An IED is disclosed for distributed power management in an electrical power network, the IED comprising: means for communicating with other IEDs; and means for issuing a load shed command at a programmed time delay and/or based on a message communication received by the IED.

DRAWINGS

These and other features, aspects, and advantages of the present invention will become better understood when the following detailed description is read with reference to the accompanying drawings in which like characters represent like parts throughout the drawings, wherein.

Figure 3:
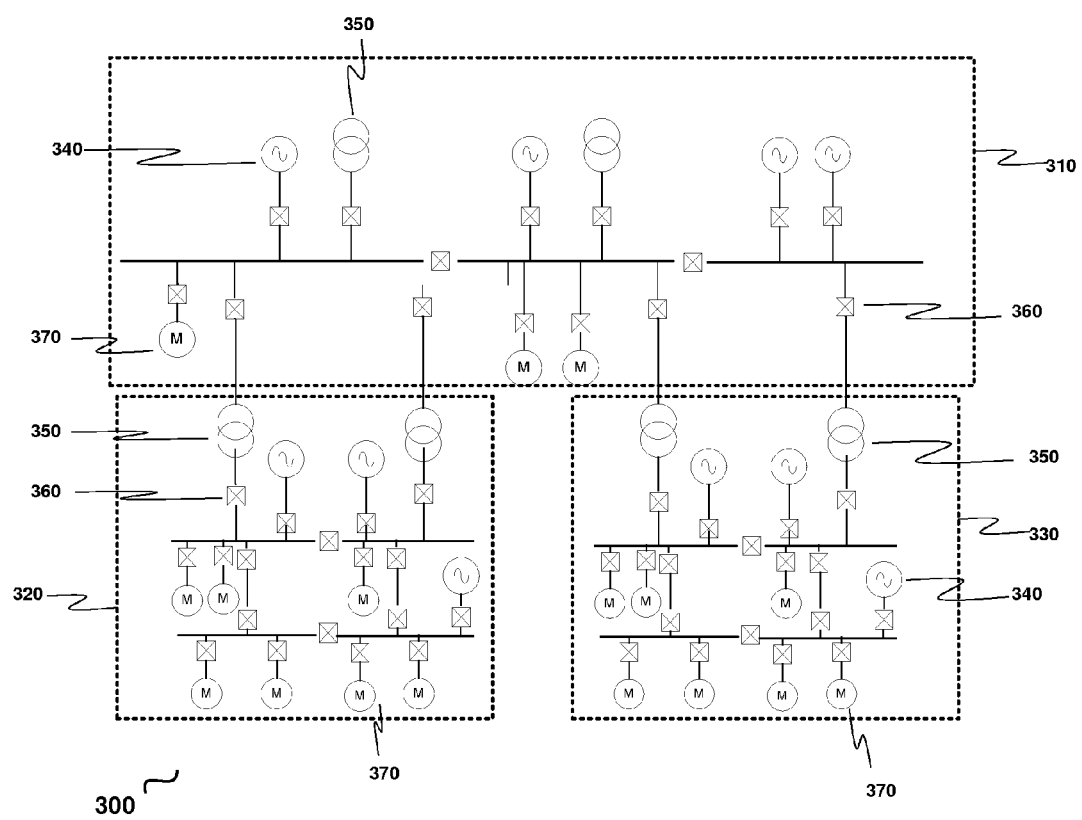
Figure 4:
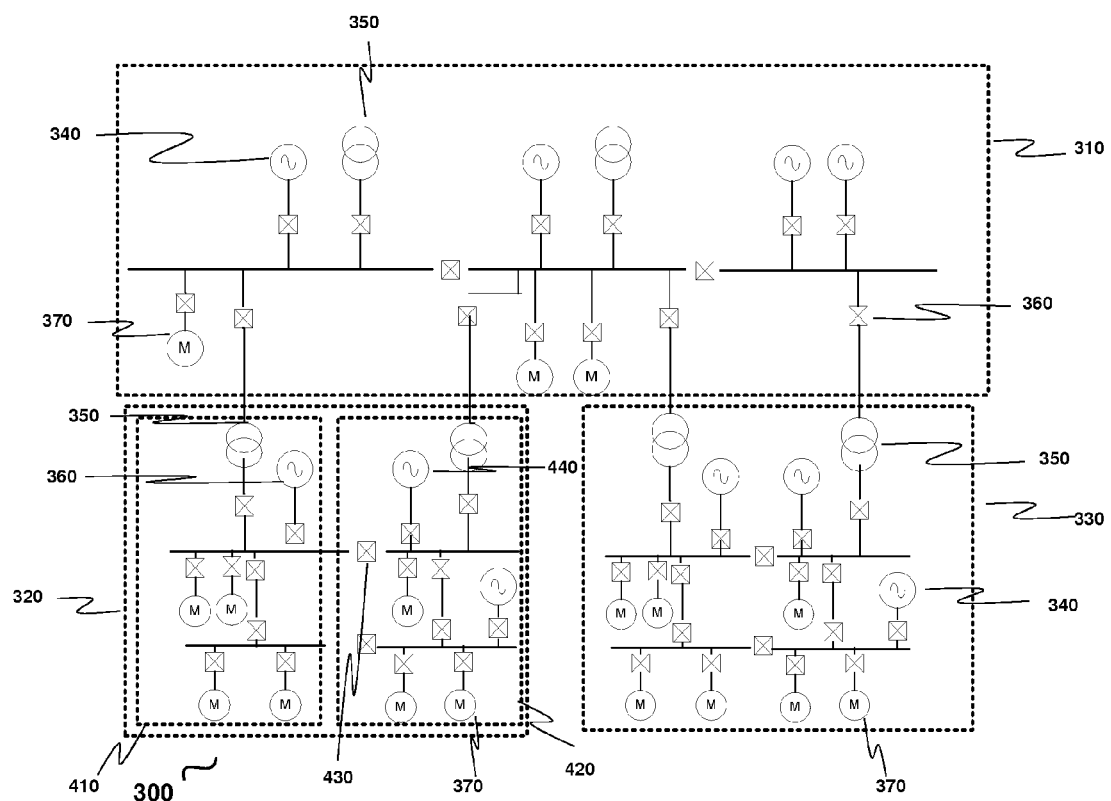

FIG. 3. is an exemplary electrical single line diagram depicting local process areas; and FIG. 4. depicts distributed load shedding operations in the exemplary electrical single line diagram of FIG. 3.

DETAILED DESCRIPTION

According to one aspect, a method for distributed load shedding in an electrical power network divided into one or more sections by an IED in a section of substation is disclosed. The method includes a step of identifying an IED (first IED) that performs as a designated Master for the IEDs in the section or as the IED that carries out load shedding by controlling a circuit breaker managed by it. The first IED issues load shed command in the power network. The first IED is involved with exchange of power network data between at least one IED (second IED) in its section and also coordinates with exchange of power network data and messages with at least one another IED in neighboring/connected sections. The at least one IED in neighboring/connected section involved in power data exchange is also referred as the second IED. The first and second IEDs are designated through configuration during engineering of the subsystem and may also dynamically be designated through standby definitions in the configurations to take care of any outage situation in the electrical or communication network.

The method further includes identifying a power imbalance state by any IED in the section to generate a load shedding trigger in the electrical power network. The first IED estimates a power balance condition by carrying out power balance calculations or/and acting on a predefined manner to achieve power balance in the electrical power network. The load shedding is performed by the identified IEDs in at least one section based on the power balance estimation in a coordinated manner between various identified IEDs in and around the section reporting power imbalance state in the electrical power network.

According to an exemplary embodiment, IEDs for use in a power network in a substation are disclosed where each individual IED includes a load shedding module, where the load shedding module includes an intrinsic load shedding function configured for shedding the load controlled by the individual IED when a power imbalance state, (with respect to the entire power network) is identified at the individual IED. The individual IEDs are configured to coordinate power management based on the programmed time delay that is based on the priority of the section involving the individual IED or the priority of the power equipment managed by the IED or/and based on message communication between the individual IEDs.

An exemplary system and method for load shedding as described herein includes decentralized or distributed load shedding (LS) technique that is based on power balance concept in the IEDs of a substation in any process industry for example a cement or a pulp and paper plant. The power balance concept is well known to those skilled in the art and states that power generated should be equal to power consumed and in case this is not so then action to restore this balance needs to commence. Load shedding is one technique employed to restore this power balance. The technique described herein leads to effective load shedding management within one or more substations whose substation automation networks have a common identity. As used herein, the substations whose automation networks have a common identity means that the IEDs/nodes on the network belong to the same SUBNET (a hub for one or more substation networks). One would also recognize that the communication connectivity may be extended as found suitable for management of distributed load shedding through proper engineering based on the communication network layout. The management may also be based on identification (ID) issued for IEDs based on their network or a logical groups defined in the power network for the purpose of engineering.

The IEDs as described herein can include a load shedding function implemented along with the regular protection, monitoring, metering and control based functions, and this load shedding functionality at individual IED results in a decentralized or distributed load shedding. The technique described herein is based on Open Communication Standards (OCS) like IEC61850 and the IEDs described herein operate on IEC61850 GOOSE communication profile based interface between IEDs at the substation.

Figure 1:
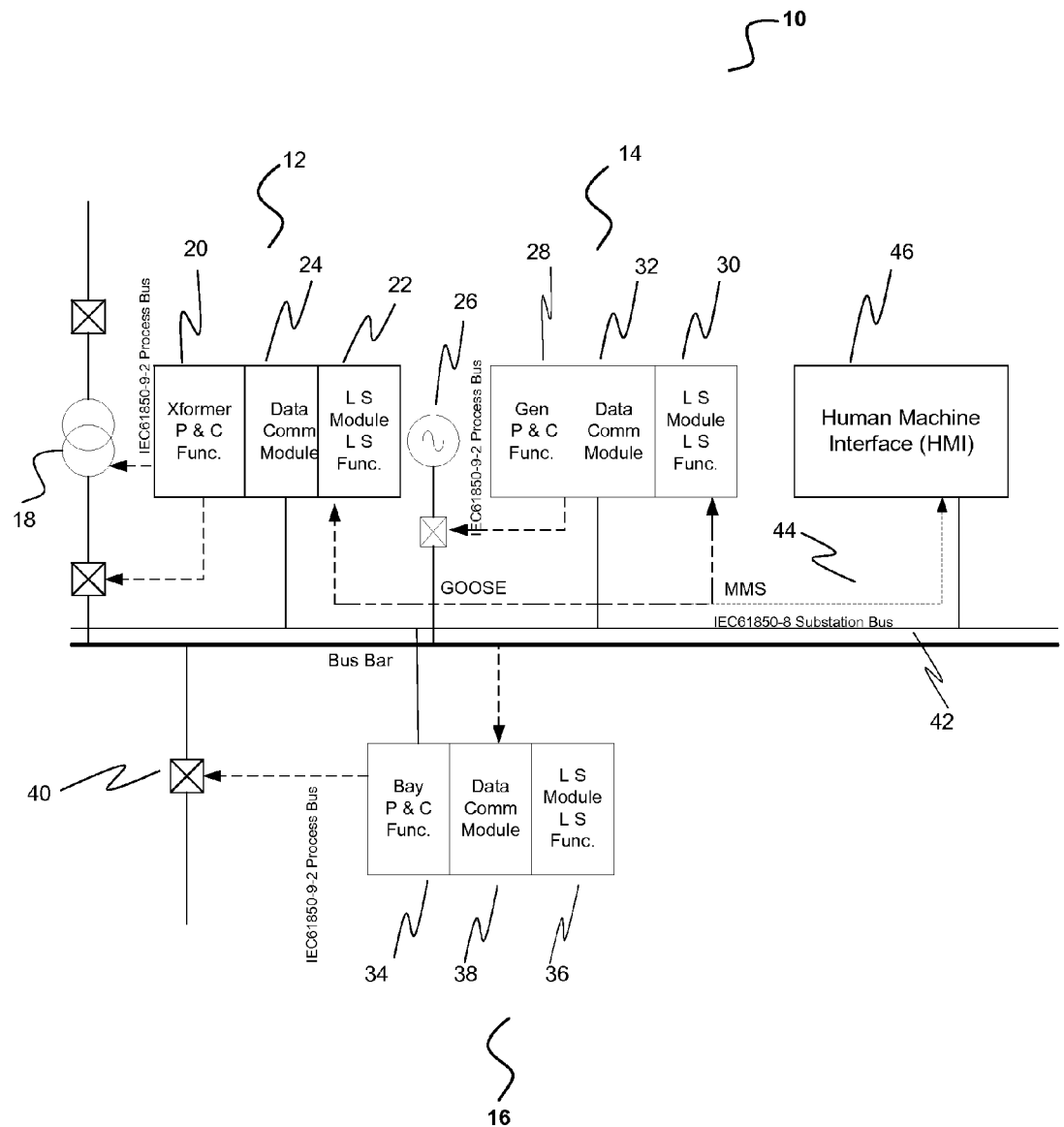
FIG. 1 is a block diagram representation of an exemplary substation including a plurality of IEDs, each IED including a load shedding function in accordance with an exemplary embodiment.

Turning now to drawings, FIG. 1 is a diagrammatic representation of a substation 10. The substation 10 includes several IEDs 12, 14, and 16. Each IED 12, 14, 16 is also referred herein as individual IED. The IED 12 is associated to a transformer 18 and includes the transformer protection and control function 20. In the exemplary embodiment, the IED 12 advantageously includes a load shedding module 22. It will be appreciated by those skilled in the art that the load shedding module is a software (e.g., a software module running on one or more computers or processors) implementation in the exemplary embodiment.

The IED 12 can also include a data communication module 24 that is an intrinsic part of the IED architecture. Similarly, the IED 14 that is coupled to a generator 26 includes a generator protection and control function 28, a load shedding module 30 and a data communication module 32. On the load side, the load feeder IED 16 similarly includes a bay protection and control function 34, a load shedding module 36 and a data communication module 38.

In the exemplary embodiment, in each of the IEDs 12, 14, 16, the respective load shedding modules 22, 30, and 36 include an intrinsic load shedding function that is based on the power balance calculation in each IED. The IEDs may be a power source feeder IED for example IED 12 coupled to the power source like a transformer 18 or a tie feeder in a power network. The IED may be a load feeder IED, for example IED 16 that is connected to a circuit breaker 40. The power network is defined by a set of loads, circuit breakers that are connected to enable power flow. Switches (not shown for simplicity purpose) can be used to connect or disconnect components from each other to form different power networks.

The various IEDs that are associated with power equipment such as generators, transformers, loads, circuit breakers and other electrical components. These power equipment are connected through a communication bus or network for example IEC 61850 substation bus generally indicated by reference numeral 42. The IEDs communicate with each other through IEC61850 GOOSE communication profile as indicated by reference numeral 44. A Human Machine Interface 46 is also provided to control, monitor and issuing any commands for power management of the substation 10.

In accordance with the exemplary embodiment, the IEDs are preconfigured by a configuration tool (not shown in FIG. 1 for the sake of simplicity) to identify its neighboring IEDs or at least one another IED (Master IED in a section, introduced in the later part of the disclosure) in the power network. The data communication modules within each IED are configured such that each of the IEDs is capable to send and receive load shedding information from other IEDs in the power network.

The communication may have optimized data exchange based on a programmed periodicity or event based communications or just by proper configuration to ensure the communication is kept to minimum and contained locally to avoid excessive overloading of communication network. There exist many well established optimization techniques for data exchange. As an example of two IEDs communicating with each other, an IED (example IED 12) interacts with only its 'neighbor' IEDs (for example, IEDs 14 and 16) to ascertain/get the power network data for LS. The load shedding function in each IED is capable to undertake power balance calculations based on the inputs from other IEDs. Once a power imbalance state is reached in the network, each IED configured for power management is capable to issue a load shed command based on its assigned load shedding priority. Thus, each IED is configured to manage load shedding individually based on the power balance calculation.

In an exemplary implementation a power source outage triggers power balance calculations in at least one identified load feeder IED and have the needed (example IED 12) loads shed in the power network. In case of a load fault i.e. a fault at the load feeder, the load feeder IED (example IED 16) is triggered to cease participation in the power network for load shedding. Further, in the exemplary implementation a deficiency of power in the power network, triggers the load feeder IED (example IED 16) to initiate a trip (control) command for a circuit breaker (example circuit breaker 40) coupled to the load feeder IED.

The data communication modules (24, 32, 38) at each IED (12, 14, 16) as described herein can ensure dynamic communication topology that allow the IEDs in the same network to identify each other and have data exchange associations. It would be appreciated by those skilled in the art that in an exemplary embodiment, only IEDs in the same subnetwork (SUBNET) need to exchange Load Shedding information. This can lead to optimization (minimization) of the GOOSE communication cross flow and optimization of the calculations effort in every IED. Further, during a reconfiguration scenario at the substation, the changed configurations can be downloaded only to a minimum number of IEDs. In one exemplary embodiment this aspect is also implemented through the data communication modules that include a 'self learning' procedure or mode that informs the other IEDs (for example the neighbour IEDs) dynamically based on the changes downloaded into the minimum number of IEDs.

Figure 2:
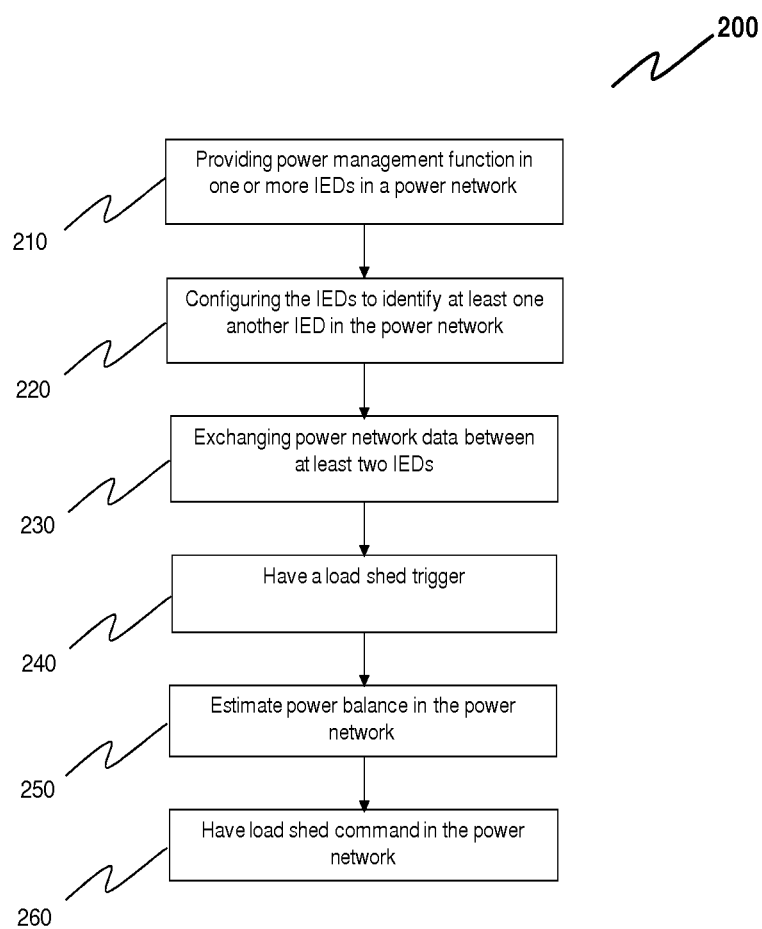
FIG. 2 is flow chart representation of exemplary steps for a method for individual IED based load shedding in the substation of FIG. 1.

Turning again to drawings, FIG. 2 is a flowchart (indicated by reference numeral 200) representation of a method (e.g., a computer implemented software method) of an individual IED based load shedding in the substation as described herein. The method can be provided for a plurality of IEDs in a power network in the substation. One or more IEDs in the power network (step 210) can be provided with power management function. Here, the power management function is the Load Shedding function but this is extendable to any function related to power management (eg shedding generators, restoring load or generators, controlling bus couplers etc) and the IED is programmed to carry out power management by itself. The method at step 220 provides configuring the IEDs to identify a first IED (IED performing local power management) in the electrical power network. At step 230, the method provides exchange of power network information between the first IED and at least one another IED (second IED). It is to be noted that for effective local power management the electrical power network may be divided into multiple sections and the second IED maybe present in the same section as the first IED or in any other section.

The method further includes at step 240 a load shed trigger generated by an IED in the power network. At step 250, the first IED in the power network performs power balance estimations and at step 260, based on the power balance estimation, there is a load shed command generated in the power network. It is to be noted that the power balance estimation may be based on equating available power with the demand (loads) having priority assigned to it or simple management for smaller power networks where status of a critical circuit breaker in the power network shall automatically result in shedding of a particular load in the power network. The power balance may be carried out also based on the load shed trigger generated as a result of change in status of a critical circuit breaker or outage of a power source.

The method further allows power balance estimation to be carried out as per the configuration by any IED that is configured with power management function. The IED may be a designated Master in the network or the IED managing a load (Eg motor) based on generation of load shed trigger. Also, it is to be noted that more than one IEDs may be configured to sense the conditions leading to load shed trigger.

It will be appreciated by those skilled in the art, that the individual IED having the intrinsic load shedding function can be thus advantageously configured for taking one or more load shedding actions based on a fault or a power deficiency state in the power network in a well coordinated manner. In case a power feeder IED becomes faulty, the load shedding action can include blocking load shedding, by every participating IED, in the power network. When load feeder IED becomes faulty, load shedding is blocked for that feeder (by its IED), that is, the feeder ceases to participate in the load shedding function. Similarly, when there is a power deficiency in the power network, the load shedding action includes tripping a circuit breaker associated with the load feeder IED.

On receiving a LS trigger, that is trip of a power source feeder (from its IED), the load shedding data associated with the load shedding action is generated at the individual IED and is communicated to the neighbor IEDs. This enables dynamic updation of power balance calculations at the at least two neighbor IEDs based on the load shedding data.

The technique used for distributed load shedding system is illustrated as an exemplary embodiment with help of FIG. 3 depicting a single Line Diagram 300 having three local sections referred here as local process areas in an exemplary plant electrical network. One of the local process areas, for example a first local process area 310 is associated with an upstream substation and the other two local process areas, a second local process area 320, and a third local process area 330 are associated with downstream substations. This exemplary depiction is also used to describe the system and technique related with an exemplary embodiment of the invention. FIG. 3 also depicts major components in the process area such as generators 340, transformer connections 350, circuit breaker or switches 360 and electrical loads 370. It must be understood, that three process areas are shown herein for ease of explanation but the system may have multiple such process areas.

Power management functions eg. Load shedding when referred are by default referred to be taking place under the control of an IED (controller) in the local process area that is managed by the IED (controller). The local load shedding as referred herein is load shedding in a local process area. Most commonly, the loads are shed in downstream substation(s) under a process plant. The local process area as referred herein includes power sources (transformer connection to grid or upstream substations or other energized networks), local generation systems and local loads.

Further, a local process area may be associated with a part of substation (in case of a large substation) or completely with one substation (medium size substation) or multiple substations (small size substation). The local process area in addition includes substation automation products (e.g. process controller, IED, network communication accessories etc.). Each local process area have an unique Identity (ID), irrespective of if the local process area is based on a single substation or between substations.

The local process areas can be further divided into subzones; for simplicity sake, it can be maintained that subzones have their ID with an additional character of their parent local process area. These IDs are defined in each IED managing protection and control (P&C) for feeders (circuit breakers) i.e. set of IEDs associated with power sources, network tie feeders, bus couplers and load feeders in the local process area. In addition, each IED has an IED designated as the Master for power management functions. For higher availability, another IED can also be designated as a standby Master and the IEDs in the substation are configured to identify the standby IED (new first IED) in case of failure of the serving current Master.

The IDs are managed such that feeder type are recognized and established with the IED identity. Power sources, network tie feeders, bus couplers (critical circuit breakers) etc are also distinguished with help of their IDs from the IEDs managing load/motor feeders. The ID management is handled at the engineering stage.

The designated Master communicates with the IEDs in its zone for power management. Real power information and circuit breaker status are communicated by the IEDs to their designated Master IED over a fast communication network and protocol (Switched Ethernet/IEC 61850 GOOSE). The Master performs local power balance calculation and in the process also considers information across neighboring local process areas, depending on power connectivity between the local process areas. Further, optionally, exemplary critical circuit breaker status information in the local process area along with their IDs can be made available to the motor/load feeders IEDs so that with the information, the LSZ motor/load feeder IEDs are made capable to generate load shed trigger information on change of status of the critical circuit breaker.

In addition, the information flow between the IEDs (controllers) could include power flow, generation capabilities, generator modes etc for the local process area, shared along with their respective ID.

The load shedding priority is defined in the IED managing load/motor feeder. This may also be done in a message from the Master and the IED in a local process area. As one would recognize, depending on the size of the subsystem, at least two level of load shedding priorities; one at the substation level and at the local process area level or also at the local process area level and zones within the local process area. These priority definitions are based on process priorities and feeder priorities.

The presence of multiple level of priorities can involve coordination amongst controllers. For example, if a load feeder has further downstream connectivity, then its priority definition has to be well coordinated with other contemporary feeders in the same bus bar and also with the priorities of 'child' feeders (who could be in other local process area) connected to the corresponding downstream incomer feeder. Such coordination is desired to prevent any unintentional trip of a load feeder by its IED. Inter-zonal or Inter-local process area LS coordination can be done in a manner to have load shedding function for lowest priority zone or local process area can be programmed to act faster. The higher priority local process area/zone can be programmed to act after a configured predefined time delay. In exemplary embodiments of the invention, mere mention of priority includes presence of multiple levels of priorities based on substations, local process area/zone or power equipment/load.

On the event, when a Master triggers load shedding in a particular local process area, the information can be also sent to Masters in the adjacent local process areas to prevent them from taking unnecessary load shedding action simultaneously. Such communications are preferably made over IEC 61850 GOOSE or other path. Thus, the load shedding activities in a substation are coordinated with help of programmed time delays and message communication between the distributed controllers in the substation and this can ensure that the combined network with interconnectivities between local process area functions well through distributed load shedding controllers (IEDs) without having any disturbance (power source outage) cause load shedding in all the local process areas. Further, proper time coordination between Master IEDs ensure granularity in load shedding.

Each Master in its local process area performs network determination based on information of power sources and network defining circuit breakers for power balance calculations (option 1). Alternatively, the IEDs in a local process area can themselves determine the network configuration as they have all the critical circuit breaker status information (option 2). Any of the two options may be used to trigger load shedding in the local process area.

The Master on periodic basis updates using IEC 61850 GOOSE every IED in its local process area with power balance calculation values, accumulated load value against the specific priority that is set for the feeder (for the IED managing the feeder) and load shed trigger if any (option 1). If there is a power source outage or any shortfall in available power, the load feeder IED may also directly senses it (option 2). This aspect in the distributed load shedding system is different compared to the known load shedding method in a centralized system where the centralized controller managing power balance for the entire substation is required to sense the imbalance condition for power management. The advantage, here, in the distributed load shedding system, is the speed for the power management functionalities resulting in the load shed trigger generated within the local process area and also by the load/motor feeder for fast response.

If the net available power is less than the accumulated power against the priority to which the feeder belongs to and there is a load shed trigger, a load shed command is activated by the load/motor feeder IED to trip its own circuit breaker. Thus, the load shed sensing and activation mechanism is managed locally by the distributed IEDs in a local process area within a substation/plant network.

Further, the architecture of distributed IEDs with a designated Master allows distributed load shedding carried out through following considerations:

A designated Master accesses power balance information from adjacent local process areas Definitions of standby Masters defined with the order of command (hierarchy) so that at any given time there is only one Master in control across the power network.

All the other standby Masters to take command in the order of their command only when the designated Master fails or if the power network disintegrates (due to opening of a network circuit breaker) in their respective local process areas or zones.

As an example of distributed load shedding, FIG. 4 is being referred. Two zones (410, 420) in local process areas 320 are being considered for illustrated coordination and handling of load shedding functions involving the two zones within a local process area. In the two zones, one would recognize various critical circuit breakers (e.g., the one connected to generators, transformers or bus couplers). For this illustration, the critical breaker 430 is considered to be closed. Note, both the zones shall have their designated Master managing power for their respective zone. In case of power shortage by generator 440 outage in the zone 420, the Master in zone 410 calculates the power balance of the zone 410 and also receives the power balance situation for the zone 420 by the designated Master in the zone 420. As the power balance for the zone 420 network will be negative, the designated Master in the zone 410 will send a load shed trigger signal to the designated Master in the zone 420 (option 1). The designated Master in the zone 420, in turn, will send the load shed trigger command, based on the priority definition in the zone 420, to the responsible IED in the zone 420 to shed a particular load. Thus, the desired load shedding is affected without causing multiple load sheddings in various zones and the power network achieves distributed load shedding and self healing property.

Thus the technique described herein advantageously provides a power balance calculation based load shedding function in every IED, and ensures coordinated functioning to achieve distributed load shedding functions. It is also to be recognized that though load shedding function is illustrated as power management function but in the true spirit of the invention, the load shedding function also includes connection of new loads or generators and not just tripping of load for power management function.

While only certain features of the invention have been illustrated and described herein, many modifications and changes will occur to those skilled in the art. It is, therefore, to be understood that the appended claims are intended to cover all such modifications and changes as fall within the true spirit of the invention.

As such, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A method for distributed power management in an electrical power network divided into one or more sections and having plural intelligent electronic devices (IEDs) communicatively connected in a communication network configured for power management function in the one or more sections of the electrical power network, the method comprising:

identifying a first IED from the plural IEDs in a section of the electrical power network that issues a load shed command;

exchanging power network data between the first IED and one or more IEDs from the plural IEDs in the electrical power network, the data including at least power balance calculation values and an accumulated load value;

having the first IED or a second IED of the plural IEDs in the electrical power network identify a power imbalance state in the electrical power network based on the exchanged power network data and generate a load shed trigger in the electrical power network based on at least the accumulated load value as compared with a priority set for an electrical circuit associated with the first IED;

having the first IED estimate a power balance condition in the electrical power network based on the load shed trigger generated in the electrical power network; and having the first IED or the second IED perform coordinated power management in the electrical power network based on the estimated power balance condition in the electrical power network.

2. The method of claim 1, wherein the plural IEDs in the electrical power network are configured to dynamically identify the first IED in the electrical power network.

3. The method of claim 1, wherein the first IED is a preconfigured Master for the section of the electrical power network for power management.

4. The method of claim 1, wherein the first IED is a load/motor feeder IED in the electrical power network.

5. The method of claim 1, wherein the exchange of power network data is with at least one IED from a different section in the electrical power network from the section having the first IED.

6. The method of claim 1, wherein the second IED is a load/motor feeder IED in the electrical power network.

7. The method of claim 1, wherein the second IED is an IED from a different section in the electrical power network from the section having the first IED.

8. The method of claim 1, wherein the estimation of power balance condition in the electrical power network is based on managing one or more sections or loads assigned with a priority.

9. The method of claim 1, wherein the estimation of power balance condition in the electrical power network is based on status of at least one critical circuit breaker.

10. The method of claim 1, wherein distributed power management in the electrical network is carried out with load shed commands in at least one section of the electrical power network by the first IED in the at least one section.

11. The method of claim 1, wherein distributed power management in the electrical network is carried out by issue of a load shed command by a first IED to control a circuit breaker managed by the first IED.

12. The method of claim 1, wherein the distributed power management in the electrical network is coordinated with having at least one IED in the electrical power network having a programmed time delay for power management defined based on a priority of the section managed by the IED and/or power equipment managed by the IED.

13. The method of claim 1, wherein the distributed power management in the electrical network is coordinated with having at least one IED in the electrical power network with message communication between the plural IEDs in the electrical power network.

14. A system for distributed power management in an electrical power network divided into one or more sections and having plural intelligent electronic devices (IEDs) communicatively connected in a communication network configured for a power management function in the one or more sections of the electrical power network, the system comprising:

a plurality of identified IEDs for one or more sections in the electrical power network to issue a load shed command in their respective sections in coordination with each other, by communicating with each IED within a respective section, data including at least power balance calculation values and an accumulated load value, wherein the coordination is established with a programmed time delay in each of the identified IEDs based on the accumulated load value as compared with a priority set for an electrical circuit associated with a respective identified IED.

15. An IED for distributed power management in an electrical power network, the IED comprising:

means for communicating with other IEDs, the communication including at least updating each other IED with data including at least power balance calculation values and an accumulated load value; and means for issuing a load shed command at a programmed time delay based on at least the accumulated load value as compared with a priority set for an electrical circuit associated with the IED.

* * * * *